United States Patent
Leuenberger et al.

(10) Patent No.: US 11,097,847 B2
(45) Date of Patent: Aug. 24, 2021

(54) OXYGEN SUPPLY DEVICE AND METHOD FOR SUPPLYING A PASSENGER CABIN OF AN AIRCRAFT WITH OXYGEN

(71) Applicant: Airbus Operations GmbH, Hamburg (DE)

(72) Inventors: Frank Leuenberger, Hamburg (DE); Carsten Neumann, Hamburg (DE)

(73) Assignee: Airbus Operations GmbH

( * ) Notice: Subject to any disclaimer, the term of this patent is extended or adjusted under 35 U.S.C. 154(b) by 369 days.

(21) Appl. No.: 16/183,038

(22) Filed: Nov. 7, 2018

(65) Prior Publication Data

US 2019/0152612 A1    May 23, 2019

(30) Foreign Application Priority Data

Nov. 20, 2017  (DE) .................... 10 2017 127 293.3

(51) Int. Cl.
*B64D 13/06*  (2006.01)
*B01J 7/00*   (2006.01)
*C01B 13/02*  (2006.01)

(52) U.S. Cl.
CPC ............... *B64D 13/06* (2013.01); *B01J 7/00* (2013.01); *C01B 13/02* (2013.01);
(Continued)

(58) Field of Classification Search
CPC .. B64D 13/06; B64D 13/00; B64D 2013/064; B64D 2013/0648; B64D 2013/0677;
(Continued)

(56) References Cited

U.S. PATENT DOCUMENTS 3,516,797 A    6/1970   Bovard et al.
3,981,300 A    9/1976   Williams
(Continued)

FOREIGN PATENT DOCUMENTS

EP    2090335 A1    8/2009
EP    2127699 A1    12/2009
(Continued)

OTHER PUBLICATIONS

European Search Report for Application No. EP08151305, dated Jul. 2, 2008, 2 pages.
(Continued)

*Primary Examiner* — Emmanuel E Duke
(74) *Attorney, Agent, or Firm* — Lerner, David, Littenberg, Krumholz & Mentlik, LLP

(57) ABSTRACT

An oxygen supply device for an aircraft has a reaction tank for chemical oxygen generation and a pressurized tank filled with oxygen. The oxygen supply device also has an energy converter for converting thermal energy into electrical energy and also a control unit for setting a first amount of oxygen, provided by the reaction tank to a consumer unit, and a second amount of oxygen, provided by the pressurized tank to the consumer unit. The energy converter is designed to convert a thermal energy, generated by the chemical oxygen generation in the reaction tank, into electrical energy and to provide the electrical energy. The control unit is designed to set the second amount of oxygen, provided by the pressurized tank to the consumer unit, by using the electrical energy provided by the energy converter. The invention also relates to a method for supplying a passenger cabin of an aircraft with oxygen.

10 Claims, 3 Drawing Sheets

(52) U.S. Cl.
CPC .... *C01B 13/0218* (2013.01); *B64D 2013/064* (2013.01); *B64D 2013/0648* (2013.01); *B64D 2013/0677* (2013.01); *B64D 2013/0681* (2013.01)

(58) Field of Classification Search
CPC . B64D 2013/0681; B64D 11/00; C01B 13/02; C01B 13/0218; B01J 7/00; Y02T 50/50; A62B 7/14; A62B 7/08
See application file for complete search history.

(56) References Cited

U.S. PATENT DOCUMENTS

| | | | |
|---|---|---|---|
| 4,230,667 A | | 10/1980 | Williams |
| 4,651,728 A | * | 3/1987 | Gupta ................... A62B 7/14 128/201.28 |
| 4,960,119 A | * | 10/1990 | Hamlin ................... A62B 7/14 128/201.25 |
| 9,089,721 B1 | * | 7/2015 | Horstman ............... A62B 7/14 |
| 2005/0061915 A1 | | 3/2005 | Vogt et al. |
| 2006/0054740 A1 | | 3/2006 | Hoffjann et al. |
| 2010/0012116 A1 | * | 1/2010 | Rittner .................. A62B 7/08 128/202.26 |
| 2010/0051113 A1 | | 3/2010 | Bricard et al. |
| 2011/0000490 A1 | * | 1/2011 | Gillotin ................. A62B 7/14 128/204.26 |

FOREIGN PATENT DOCUMENTS

| | | |
|---|---|---|
| EP | 2 127 699 B1 | 10/2011 |
| EP | 3 235 545 A1 | 10/2017 |
| JP | 2003092433 A | 3/2003 |
| WO | 8701949 A1 | 4/1987 |
| WO | 9807082 A2 | 2/1998 |
| WO | 2006100094 A1 | 9/2006 |
| WO | 2009/100900 A1 | 8/2009 |
| WO | 2013/176996 A1 | 11/2013 |
| WO | 2013/180994 A1 | 12/2013 |
| WO | 2015/095409 A1 | 6/2015 |

OTHER PUBLICATIONS

European Search Report for Application No. EP08157276, dated Nov. 3, 2008, 2 pages.

* cited by examiner

OXYGEN SUPPLY DEVICE AND METHOD FOR SUPPLYING A PASSENGER CABIN OF AN AIRCRAFT WITH OXYGEN

FIELD OF THE INVENTION

The present invention relates to supplying oxygen for aircraft and spacecraft systems. In particular, the invention relates to an oxygen supply device for an aircraft and to a method for supplying a passenger cabin of an aircraft with oxygen.

BACKGROUND OF THE INVENTION

Depending on the operating state of the aircraft, various possibilities come into consideration for supplying a passenger cabin of an aircraft with oxygen. The primary source for supplying air to the passenger cabin of an aircraft is generally the engines of the aircraft. However, other oxygen supply systems also come into consideration, such as for example the supply provided by compressed air from oxygen tanks or by chemically generated oxygen. A chemical oxygen supply uses a chemical reaction, which generates heat and oxygen without electrical energy being required for this. However, because of the weight, this type of oxygen generation is less suitable for longer supply times of more than 30 minutes.

In the case of the gaseous supply of oxygen, pure, gaseous oxygen is stored in a closed high-pressure cylinder. In this case, it is necessary to reduce the pressure of the oxygen gas before it is fed into the passenger cabin and to regulate the oxygen flow to the required amount in dependence on the ambient pressure of the cabin. This requires electronic measurement and control devices and an electropneumatic flow limitation. As a result, longer supply times of up to 60 minutes can be achieved.

US 2010/051 113 A1 describes a redundant gas supply or oxygen supply for an aircraft comprising two main lines and a group supply line, which is connected to one consumer or to a multiplicity of consumers. A connecting line in each case connects the respective one main line to the group supply line. Flow limiters and nonreturn valves may be provided in the connecting lines.

US 2005/061 915 A1 describes a control for connecting a therapeutic oxygen supply to an emergency oxygen distribution system of an aircraft, the oxygen source being used either partially for therapeutic purposes or fully for emergency purposes.

BRIEF SUMMARY OF THE INVENTION

An aspect of the present invention may reduce the power consumption in an aircraft.

According to one aspect of the invention, an oxygen supply device for an aircraft is provided. The oxygen supply device has a reaction tank for chemical oxygen generation and a pressurized tank filled with oxygen. The oxygen supply device also has an energy converter for converting thermal energy into electrical energy. The oxygen supply device has a control unit for setting an amount of oxygen provided by the pressurized tank to a consumer unit. For example, the control unit is designed to set a first amount of oxygen, provided by the reaction tank to the consumer unit, and a second amount of oxygen, provided by the pressurized tank to the consumer unit. The energy converter is designed to convert a thermal energy generated by the chemical oxygen generation in the reaction tank into electrical energy and to provide the electrical energy. The control unit is designed to set or regulate the amount of oxygen provided by the pressurized tank to the consumer unit by using the electrical energy provided by the energy converter. In particular, the control unit is designed to set or regulate the second amount of oxygen, provided by the pressurized tank to the consumer unit, by using the electrical energy provided by the energy converter.

The first amount of oxygen may in this case also describe a first flow of oxygen, coming from the reaction tank, that is to say a first amount of oxygen per unit of time. Similarly, the second amount of oxygen may describe a second flow of oxygen, coming from the pressurized tank, that is to say a second amount of oxygen per unit of time. The terms amount of oxygen and flow of oxygen may be taken hereinafter to have the same meaning or a similar meaning.

With such an oxygen supply device, two techniques for supplying oxygen can be advantageously combined with one another, to be specific the combination of a chemical oxygen supply with a pressurized gas oxygen supply. In particular, the oxygen supply device according to an embodiment of the invention allows the electrical energy consumption for the oxygen supply to be reduced, or even avoided, during relatively long operating times, so that the oxygen supply device does not require an external power supply. For this, chemically generated oxygen is provided for an initial short operating time by a relatively small chemical generator, that is to say the reaction tank. The thermal energy of the chemical reaction thereby generated can be converted into electrical energy by an energy recovery process in the energy converter. The electrical energy is stored during the operating time of the reaction tank in an energy store, for example a capacitor. After the end of the reaction, that is to say after the chemical oxygen generation in the reaction tank, the pressurized gas oxygen supply by the pressurized tank is activated for the remaining supply time. The electrical energy for operating the oxygen flow regulation from the pressurized tank can then be provided by the electrical energy provided or by way of the electrical energy stored in the energy store.

The reaction tank may be a chemical oxygen generator that is equipped with a mechanical ignition device. The chemical reaction in the reaction tank may be an exothermic reaction, by which oxygen is generated. For example, sodium chlorate and iron may react with one another during the chemical reaction, whereby chemically generated oxygen is produced while giving off heat. The chemical reaction in this case takes place inside the reaction tank. The oxygen generated in this way can provide the first amount of oxygen, which is for example provided to the consumer unit as emergency oxygen. The consumer unit may be a passenger cabin of a vehicle, in particular an aircraft. It is possible that the consumer unit is an emergency oxygen mask for a passenger in the passenger cabin. In this case, the first amount of oxygen is directed to the consumer unit by way of a first oxygen line.

The heat may be transferred to the energy converter via the walls of the reaction tank, a wide variety of possibilities for converting the generated thermal energy into electrical energy coming into consideration. The energy converter may be a thermal-electrical energy converter, which generates an electrical voltage from the operating temperature of the reaction tank when it is in operation. The energy converter may for example have a piezoelectric power generator. It is also possible that the energy converter has one or more Peltier elements for converting the thermal energy into electrical energy, in order to generate the electrical energy from the thermal energy released by the exothermic reaction in the reaction tank. Subsequently, the electrical energy preferably takes the form of electrical power.

The electrical energy generated is then fed to the control unit by way of power lines. It is possible that the electrical energy generated is first fed to a voltage transformer and/or an energy store, before the electrical energy arrives at the control unit. On the basis of the electrical energy generated, in particular the electrical power generated, the voltage transformer can provide a constant voltage, for example of 3 V or more, which is subsequently used for operating the control unit in order to set the second amount of oxygen transferred to the consumer unit by the pressurized tank by using the electrical energy provided by the energy converter. This may involve performing an activation of the pressurized tank by means of the control unit, in particular opening a control valve, so that a flow of oxygen from the pressurized tank is initiated in order to provide the second amount of oxygen to the consumer unit.

The pressurized tank may for example be a gas cylinder or the like filled with pressurized gas, that is to say oxygen gas kept under pressure. In particular, the pressurized tank may be a permanently closed or sealed cylinder oxygen tank with an electrical ignition device. The pressurized tank has a connection to a second oxygen line, so that the second amount of oxygen, provided by the pressurized tank, can be provided to the consumer unit by way of the second oxygen line.

According to one embodiment of the invention, the oxygen supply device has a sensing unit for sensing a measured value, wherein the measured value that is sensed corresponds to a flow of oxygen from the reaction tank and/or wherein the measured value that is sensed corresponds to an ambient pressure in or outside the aircraft and/or wherein the measured value that is sensed corresponds to an operating time of the control unit.

The sensing unit may have a sensor for detecting the flow of oxygen directed through the first oxygen line. This means that the flow of oxygen coming from the reaction tank can be detected by the sensing unit and is provided to the control unit as a measured value.

The sensing unit may also have a pressure sensor for measuring a cabin pressure in the passenger cabin of the aircraft in order to measure the pressure in the cabin and provide the pressure measured value that is measured from the cabin to the control unit.

The sensing unit may also determine the operating time of the control unit, it being possible for the operating time of the control unit to be dictated by the beginning of the power supply, by the electrical energy provided by the energy converter and/or by the stored electrical energy provided by the energy store.

According to a further embodiment of the invention, the control unit is designed to set the second amount of oxygen, provided by the pressurized tank to the consumer unit, in dependence on the measured value that is sensed.

The control unit may for example have a computing unit or a computer for processing the measured values that are sensed and for generating control signals on the basis of these measured values. The control unit preferably has a microcontroller, on which software or a program for evaluating the measured value that is sensed and for generating corresponding control signals is stored. The microcontroller is supplied with the electrical energy from the energy converter, in particular from the energy storage unit. The generated control signals activate a control valve in order to regulate the flow of oxygen from the pressurized tank. The control signals also activate the electrical ignition device of the pressurized tank in order to initiate the second flow of oxygen from the pressurized tank.

The measured value or a combination of the previously explained measured values may then be used by the control unit as a basis for regulating the flow of oxygen through the first oxygen line, coming from the reaction tank, and/or for regulating the flow of oxygen through the second oxygen line, coming from the pressurized tank. For example, the flow of oxygen from the pressurized tank may be activated if the flow of oxygen coming from the reaction tank through the first oxygen line goes below a limit value.

According to a further embodiment of the invention, the oxygen supply device has an energy storage unit, which is designed to store the electrical energy provided by the energy converter and provide it to the control unit.

Consequently, the energy provided by the energy converter can first be stored before it is used by the control unit for regulating the flow of oxygen or the amount of oxygen from the pressurized tank. For this purpose, the energy storage unit may have for example a capacitor, in particular a supercapacitor. The energy store is preferably charged by the electrical energy provided by way of the voltage transformer and maintains this state of charge during the entire supply period during which oxygen is transferred to the consumer unit by the oxygen supply device.

According to a further embodiment of the invention, an activation of the control unit is only performed when a prescribed state of charge of the energy storage unit is reached.

Consequently, sufficient energy can be stored in the energy storage unit, so that the stored energy alone is sufficient subsequently to supply electrical power to the control unit and the control circuit connected to it for setting the flows of oxygen without having to rely on an external power source. As a result, the power consumption for supplying oxygen to a passenger cabin of an aircraft can be reduced considerably.

According to a further embodiment of the invention, the control unit is designed to provide a minimum flow of oxygen from the reaction tank and/or from the pressurized tank to the consumer unit of the aircraft during a prescribed time period.

Consequently, a sufficient supply of oxygen to the consumer unit can always be ensured, in particular in the case of an emergency supply of oxygen. In this case it is possible for example for the second flow of oxygen, provided by the pressurized tank, to be initiated or increased if the first flow of oxygen becomes less, in particular if the first flow of oxygen goes below a limit value.

According to a further embodiment of the invention, the control unit is designed to set the second amount of oxygen, provided by the pressurized tank to the consumer unit, continuously by means of a control valve, so that, as the provision of the first amount of oxygen falls, the second amount of oxygen provided increases.

Consequently, a desired flow of oxygen to the consumer unit can be kept constant, so that there is compliance with any statutory regulations there may be for providing oxygen to the consumer unit. The control valve may in this case be continuously opened or closed, so that a continuous setting of the flow of oxygen provided by the pressurized tank is made possible.

According to a further embodiment of the invention, the reaction tank is designed to provide the first amount of oxygen to the consumer unit over a time period of at least 10 minutes. The pressurized tank is also designed to provide the second amount of oxygen to the consumer unit over a time period of at least 50 minutes.

This means that the flow of oxygen to be transferred to the consumer unit does not go below a minimum during a time period of altogether 60 minutes. After 10 minutes, the flow of oxygen provided by the pressurized tank can thus be activated, since the flow of oxygen from the reaction tank for example is no longer sufficient to ensure the minimum flow of oxygen to be provided to the consumer unit. Then, the pressurized tank is as it were switched on, so that a sufficient flow of oxygen is ensured for the remaining 50 minutes. These times can conform to general statutory requirements, in particular for the case of an emergency oxygen supply in a passenger cabin of an aircraft.

According to one aspect of the invention, an aircraft with the previously described oxygen supply device for supplying a passenger cabin of the aircraft with oxygen, in particular emergency oxygen, is provided.

Furthermore, use of the previously described oxygen supply device for supplying a passenger cabin of the aircraft with emergency oxygen is also provided.

According to a further aspect of the invention, a method for supplying a passenger cabin of an aircraft with oxygen is provided. In one step of the method, provision of a first amount of oxygen, obtained from a chemical reaction in a reaction tank, takes place. In a further step, provision of a second amount of oxygen, stored in a pressurized tank, takes place. In a further step, conversion of a thermal energy, generated by the chemical reaction, into electrical energy takes place. Finally, in a further step, use of this electrical energy for setting the second amount of oxygen, provided by the pressurized tank, to a consumer unit takes place.

It is possible here that initially only the first amount of oxygen is provided, and the second amount of oxygen is only provided when a certain time has elapsed and/or when a measured value has been sensed.

A typical operating cycle of the oxygen supply device according to an aspect of the invention could look as follows, in the sequence given:

First, an activation of the oxygen supply device takes place, for example automatically when there is a drop in pressure in the passenger cabin of the aircraft or as the result of a decision by the pilot. After that, flaps in the passenger cabin are opened and oxygen masks or breathing masks are provided for each of the passengers. By pulling on the breathing masks, the chemical generator, that is to say the reaction tank, is started and the exothermic reaction in the reaction tank causes oxygen to be sent to the breathing masks for at least 10 minutes and provided to the passengers. The heat generated by the chemical reaction is converted into an electrical voltage and subsequently stored. Once the electrical store has reached a certain state of charge, the microcontroller is activated and monitors the sensors for sensing the measured values. On the basis of the sensing of the sensor inputs, in particular on the basis of the sensing of the measured values (for example the measured flow of oxygen from the chemical generator, the measured flying altitude and/or the specific operating time of the microcontroller), the software of the microcontroller determines when the sealed pressurized tank is opened. On account of the thermal mass of the chemical generator, thermal energy can still be provided even when the reaction in the generator has already ended. The oxygen is then provided by the pressurized tank for at least 50 minutes.

DETAILED DESCRIPTION

The representations in the figures are schematic and not to scale.

If the same reference signs are used in various figures in the following description of the figures, these reference signs denote identical or similar elements. However, identical or similar elements may also be denoted by different reference signs.

Figure 1:
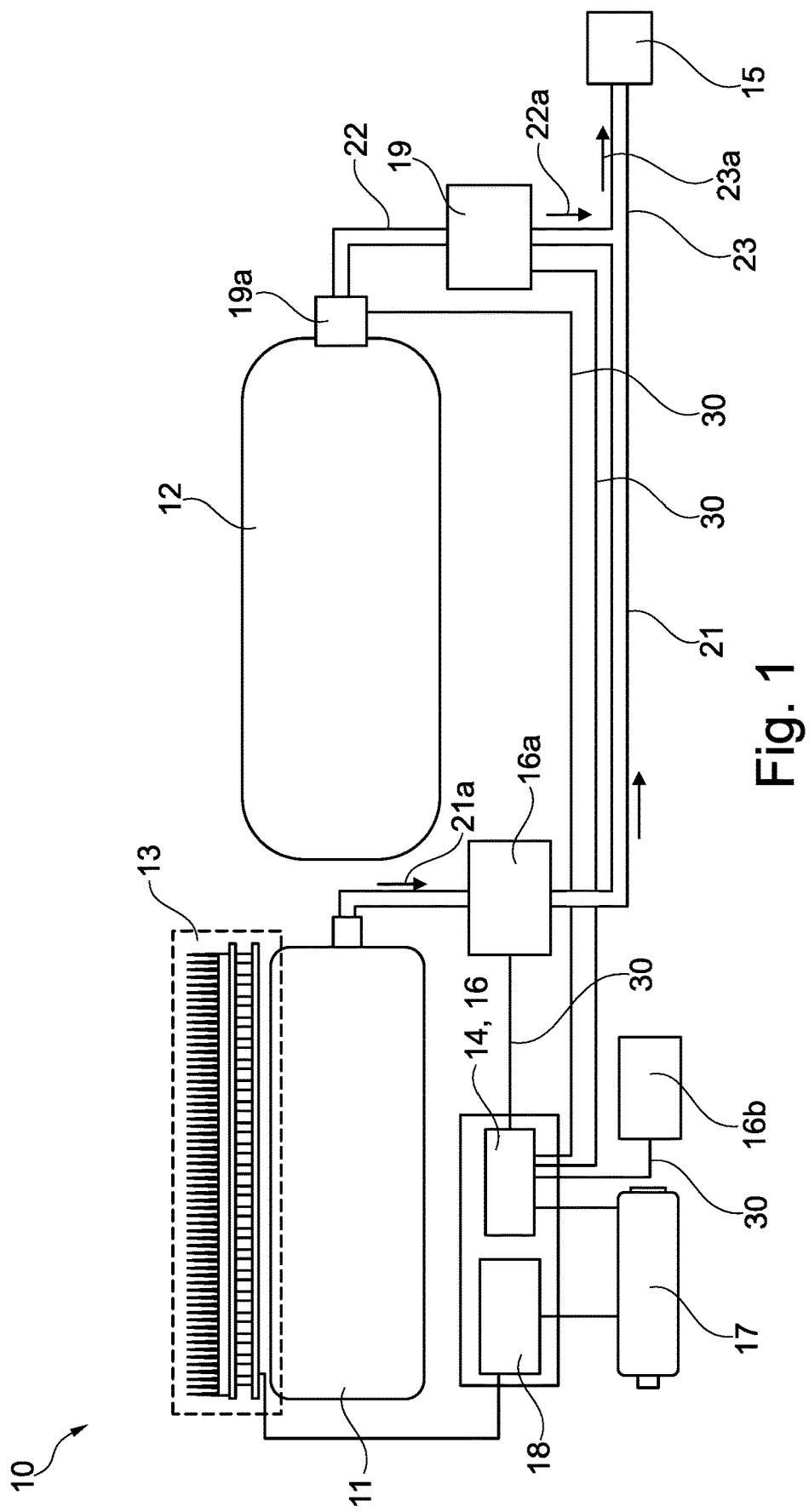
FIG. 1 shows an oxygen supply device according to an exemplary embodiment of the invention.

FIG. 1 shows a circuit diagram of an oxygen supply device 10. The oxygen supply device 10 may be part of an aircraft, in particular part of a passenger aircraft. The oxygen supply device 10 has a reaction tank 11 for chemical oxygen generation and a pressurized tank 12 filled with oxygen. The oxygen supply device 10 also has an energy converter 13 for converting thermal energy into electrical energy, in particular into electrical power. A voltage transformer 18 of the oxygen supply device 10 is designed to set a certain voltage on the basis of the electrical power generated by the energy converter 13. The electrical energy provided by the voltage transformer 18 and/or provided by the energy converter 13 may be stored in an energy store 17 and subsequently fed to a control unit of the oxygen supply device 10 or be fed directly to the control unit 14.

The control unit 14 may set or regulate a first amount of oxygen, provided by the reaction tank 11 to a consumer unit 15, and/or a second amount of oxygen, provided by the pressurized tank 12 to the consumer unit 15. In particular, a first flow of oxygen 21a, from the reaction tank 11 to the consumer unit 15, and/or a second flow of oxygen 22a, from the pressurized tank 12 to the consumer unit 15, can be set by the control unit 14. The electrical energy provided by the energy converter 13 is used for this setting that is carried out by means of the control unit 14. It is possible that the control unit 14 only sets the second amount of oxygen, provided by the pressurized tank 12 to the consumer unit 15, by using the electrical energy provided by the energy converter 13, and consequently does not need an external energy source.

The oxygen supply device 10 has a sensing unit 16 for sensing a measured value, it also being possible for the sensing unit 16 itself to be supplied with the electrical energy provided by the energy converter 13. The sensing unit 16 has a sensor 16a, for measuring the flow of oxygen 21a through a first line 21. The first line 21 in this case connects the reaction tank 11 to the consumer unit 15. The sensing unit 16 has an altitude sensor 16b in the form of a pressure sensor 16b for measuring an ambient pressure, and consequently the flying altitude of the aircraft. A pressure sensor 16b for measuring a current pressure within a passenger cabin of the aircraft may also be provided.

The sensors 16a, 16b may be connected to the control unit 14 by way of data lines 30 in order to supply the control unit 14 with data, in particular with the measured values measured by the sensors 16a, 16b.

Further signal lines or data lines 30 connect the control unit 14 to a control valve 19, so that the control valve 19 can be activated by the control signals provided by the control unit 14 in such a way that the second flow of oxygen 22a, from the pressurized tank 12 to the consumer unit 15, can be set. In this case, an electrical ignition device 19a may initiate an activation of the pressurized tank 12 likewise by control signals, that is to say start or initiate the second flow of oxygen 22a. A second line 22 connects the pressurized tank 12 to the consumer unit 15. The activation of the control valve 19 and the ignition device 19a by the control unit 14 in this case takes place by using, preferably exclusively using, the electrical energy provided by the energy converter 13. The control unit 14 sets the second amount of oxygen, provided by the pressurized tank 12 to the consumer unit 15, that is to say the second flow of oxygen 22a through the second line 22, in dependence on the measured values sensed by the sensing unit 16.

The first line 21 and the second line 22 converge into a third line 23, before the third line 23 finally ends in the consumer unit 15.

The control unit 14 is designed to provide a minimum flow of oxygen from the reaction tank 11 and/or from the pressurized tank 12 to the consumer unit 15 of the aircraft during a prescribed time period, in which the first flow of oxygen 21a through the first line 21 and/or the second flow of oxygen 22a through the second line 22 are regulated such that the flow of oxygen through the third line 23 does not go below a minimum limit value.

The control unit 14 is also designed to set the second amount of oxygen, provided by the pressurized tank 12 to the consumer unit 15, continuously by means of the control valve 19 in such a way that, as the first flow of oxygen 21a falls, the second flow of oxygen 22a is increased. It may however also be provided that the control valve 19 is only opened to provide the second flow of oxygen 22a when the first flow of oxygen 21a goes below a limit value, which is established by the sensor 16a.

Figure 2:
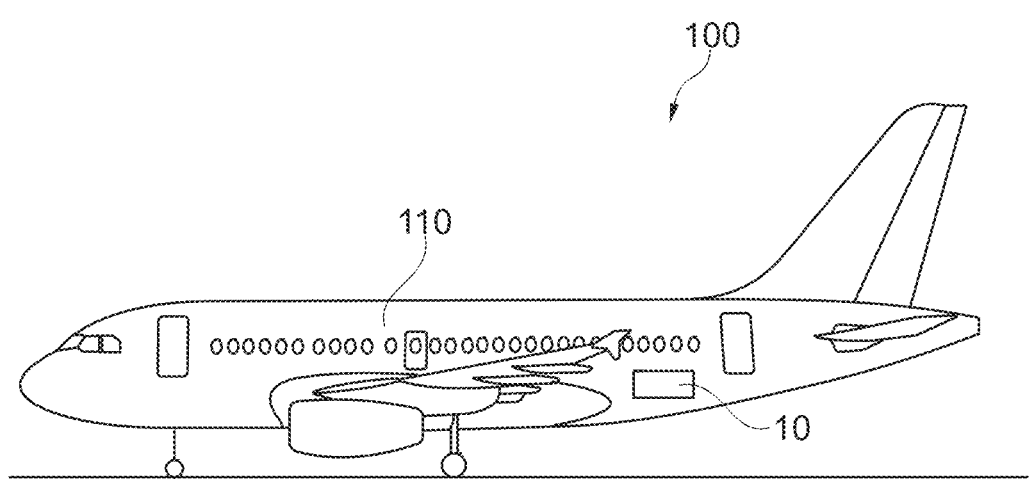
FIG. 2 shows an aircraft with an oxygen supply device according to an exemplary embodiment of the invention.

FIG. 2 shows an aircraft 100 with an oxygen supply device 10 for supplying a passenger cabin 110 of the aircraft 100 with oxygen, in particular with emergency oxygen, by way of the consumer unit 15 (not represented). It may in this case be provided that the emergency oxygen is provided to the passengers of the aircraft 100 by way of breathing masks, it being possible for the consumer unit 15 to have a multiplicity of breathing masks.

Figure 3:
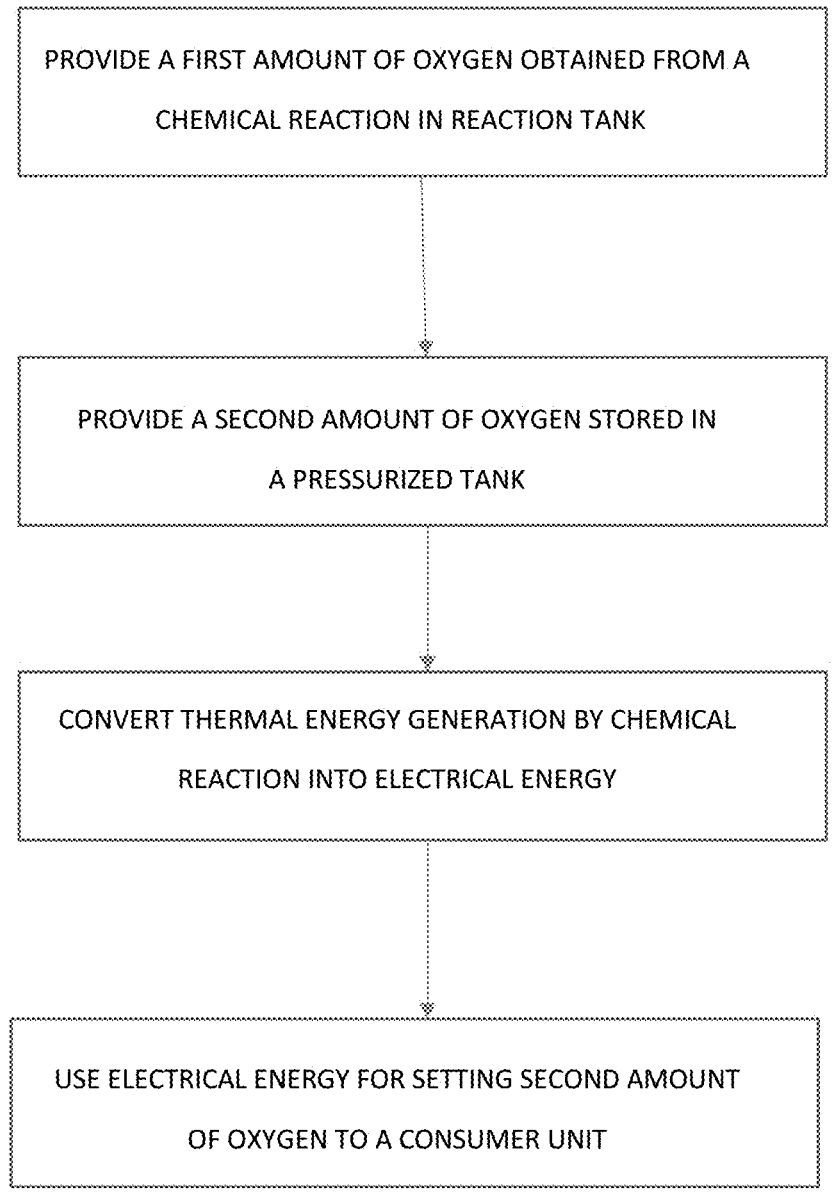
FIG. 3 shows a flow diagram for a method for supplying a passenger cabin of an aircraft with oxygen.

FIG. 3 shows a flow diagram of a method for supplying a passenger cabin 110 of an aircraft 100 with oxygen. In a step S1 of the method, a first amount of oxygen, obtained from a chemical reaction in a reaction tank 11, is provided. In a further step S2, a second amount of oxygen, stored in a pressurized tank 12, is provided. In a further step S3, a thermal energy generated by the chemical reaction is converted into electrical energy. This electrical energy is subsequently used in a further step S4 for setting the second amount of oxygen, provided by the pressurized tank 12, to a consumer unit 15.

It is additionally pointed out that "comprising" does not rule out other elements or steps, and "a" or "an" does not rule out a multiplicity. It is also pointed out that features or steps that have been described with reference to one of the above exemplary embodiments may also be used in combination with other features or steps of other exemplary embodiments described above. Reference designations in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An oxygen supply device for an aircraft, comprising:
   a reaction tank for chemical oxygen generation;
   a pressurized tank filled with oxygen;
   an energy converter for converting thermal energy into electrical energy; and
   a control unit for setting an amount of oxygen provided by the pressurized tank to a consumer unit;
   wherein the energy converter is configured to convert a thermal energy generated by the chemical oxygen generation in the reaction tank into electrical energy and to provide the electrical energy, and
   wherein the control unit is configured to set the amount of oxygen provided by the pressurized tank to the consumer unit by using the electrical energy provided by the energy converter.

2. The oxygen supply device according to claim 1, further comprising:
   a sensing unit for sensing a measured value,
   wherein the measured value that is sensed corresponds to a flow of oxygen from the reaction tank; and/or
   wherein the measured value that is sensed corresponds to an ambient pressure in the aircraft; and/or
   wherein the measured value that is sensed corresponds to an operating time of the control unit.

3. The oxygen supply device according to claim 2, wherein the control unit is configured to set the second amount of oxygen, provided by the pressurized tank to the consumer unit, in dependence on the measured value that is sensed.

4. The oxygen supply device according to claim 1, further comprising: an energy storage unit configured to store the electrical energy provided by the energy converter and provide it to the control unit.

5. The oxygen supply device according to claim 4, wherein an activation of the control unit is only performed when a prescribed state of charge of the energy storage unit is reached.

6. The oxygen supply device according to claim 1, wherein the control unit is configured to provide a minimum flow of oxygen from the reaction tank and/or from the pressurized tank to the consumer unit of the aircraft during a prescribed time period.

7. The oxygen supply device according to claim 1, wherein the control unit is configured to set the second amount of oxygen, provided by the pressurized tank to the consumer unit, continuously by a control valve, so that, as the provision of the first amount of oxygen falls, the second amount of oxygen provided increases.

8. The oxygen supply device according to claim 1,
   wherein the reaction tank is configured to provide the first amount of oxygen to the consumer unit over a time period of at least 10 minutes; and/or
   wherein the pressurized tank is configured to provide the second amount of oxygen to the consumer unit over a time period of at least 50 minutes.

9. An aircraft with an oxygen supply device according to claim 1 for supplying a passenger cabin of the aircraft with oxygen.

10. A method for supplying a passenger cabin of an aircraft with oxygen, comprising: providing a first amount of oxygen, obtained from a chemical reaction in a reaction tank, the first amount of oxygen set by a control unit; providing a second amount of oxygen, stored in a pressurized tank, the second amount of oxygen set by the control unit; converting, by an energy converter, thermal energy, generated by the chemical reaction, into electrical energy; and using, by the control unit, the electrical energy for setting the second amount of oxygen, provided by the pressurized tank, to a consumer unit.

* * * * *